Dec. 26, 1961      C. R. SHEEHAN      3,014,853
METHOD OF ASSEMBLY OF NUCLEAR FUEL ELEMENTS
Filed Nov. 24, 1958
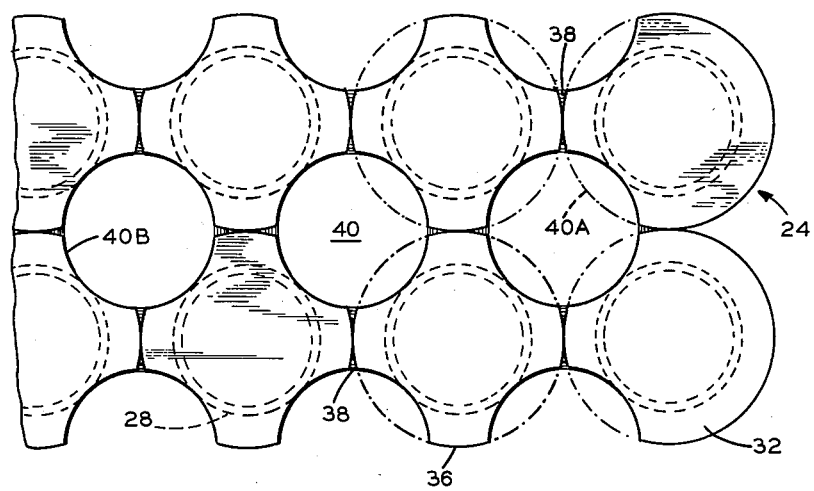
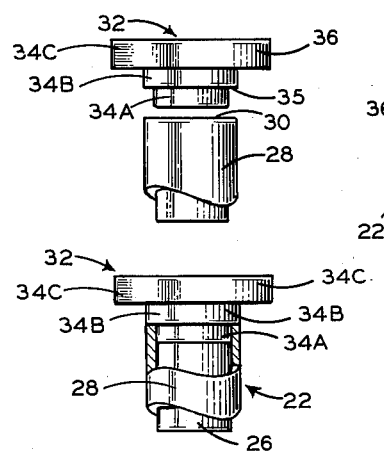
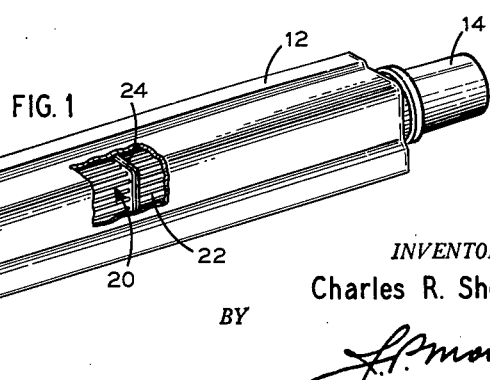
INVENTOR.
Charles R. Sheehan
BY
ATTORNEY

United States Patent Office 3,014,853
Patented Dec. 26, 1961

3,014,853
METHOD OF ASSEMBLY OF NUCLEAR FUEL ELEMENTS

Charles R. Sheehan, Lynchburg, Va., assignor to The Babcock & Wilcox Company, New York, N.Y., a corporation of New Jersey
Filed Nov. 24, 1958, Ser. No. 775,766
3 Claims. (Cl. 204—154.2)

This invention relates in general to fuel elements for use in nuclear reactors, and more particularly to a method of assembly for a nuclear fuel element containing bundles of fuel rods.

In heterogeneous reactors a fissionable material and a moderator are arranged as discrete bodies usually in a geometric pattern to form a core in which a nuclear chain reaction can be produced. Heat generated within the core by this chain reaction is in turn converted into useful energy. In order to provide for the efficient use of the heat generated, the arrangement within the core of the fissionable material, or fuel as it is usually referred to, and the provision for the flow of a coolant about the fuel, are factors of vital importance.

In present heterogeneous reactor technology, the core is generally made up of a number of heterogeneous fuel elements. The fuel elements are the basic units within which the fuel is arranged for the assembly of the core. Each fuel element is made up of one or more bundles of fuel-containing components. The fuel-containing components may or may not be arranged within a container or can, and they are fitted with means to position and secure them within the core. These means may also serve as inlets and outlets for the flow of the coolant through the fuel element. The coolant removes the heat generated within the fuel in the core for subsequent conversion into useful work.

The shape of the fuel-containing components is an important factor in providing the optimum heat exchange surface for removing the heat generated within the fuel-containing components. Further, the spacing of the components within the fuel elements is also a critical factor since the ability to remove the heat generated is dependent on the flow rate of coolant through the spaced fuel elements.

One of the preferred shapes for a fuel-containing component is a fuel rod. A fuel rod is an elongated, slender body, generally, though not exclusively, circular in cross-section. It usually comprises an outer shell or cladding which completely encloses the fuel or fissionable material within the rod. The purpose of this outer shell is to confine fission product gases and to minimize corrosion and mass transport of the fuel material. Each fuel element contains a number of fuel rods grouped together in a regular array or lattice.

The precise positioning and alignment of the fuel rods within the fuel element has been a persistent problem in reactor technology. The rods generally are arranged in closely spaced parallel relationship to provide for optimum heat exchange conditions within the reactor core. An example of fuel rod size and spacing which is fairly typical in the art is set forth in the co-pending application of the common assignee, Serial No. 712,512, M. F. Sankovich, filed January 31, 1958. In that application, fuel rods having an outer diameter of 0.3125", are disposed in a square lattice with a center-to-center spacing of 0.3805".

It has been the practice to use tube sheets in assembling a bundle of fuel rods with the ends of each of the fuel rods secured within holes drilled in the tube sheets. In addition to fuel rods, the tube sheet also must have openings for the passage of a coolant therethrough. The use of tube sheets, however, has proven to be very expensive considering the large number of tube holes and the tolerances to which these holes and their openings in the tube sheet must be drilled.

Therefore, the present invention provides a method of assembling a bundle of fuel rods for use in a nuclear fuel element wherein end caps for the fuel rods are formed so that their greatest transverse dimension is substantially equal to the center line spacing between the fuel rods. Next, the caps are placed on the fuel rods and then the rods are assembled in parallel relationship to form a bundle. The caps are integrally connected about their lateral edges thereby forming a composite member for spacing and positioning the fuel rods. Openings are provided in this composite member to permit the flow of coolant therethrough.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred form of our invention.

Of the drawings:

FIGURE 1 is an isometric view of a typical fuel element with a portion of the container cut away;

FIGURE 2 is an isometric view on an enlarged scale showing a portion of the end of one of the fuel rod bundles in FIG. 1;

FIGURE 3 is an elevation view of a fuel rod with the end plugs in position to be inserted therein;

FIGURE 4 is an elevation view similar to FIGURE 3 but with the fuel rod partially in section and with the end plug inserted therein; and FIGURE 5 is a greatly enlarged plan view of a portion of a fuel bundle with the fuel rods and end plugs in assembled position.

A typical heterogeneous reactor in which the fuel element of this application could be used is shown in detail in the previously mentioned co-pending application of Melvin F. Sankovich, Serial No. 712,512. FIGURE 1 of my application shows a fuel element 10 comprising walls of generally rectangular cross-section forming an open-ended container 12. An inlet adapter 14 and outlet adapter 16 are arranged in the opposite ends of the container 12. The fuel element 10 is designed to pass a coolant which enters through the inlet adapter 14 and leaves by way of the outlet adapter 16.

The active or fuel-containing length of the fuel element 10 is composed of a series of fuel rod bundles 20. These bundles 20 are made up of a plurality of elongated fuel rods 22 of circular cross-section arranged in parallel. The ends of the fuel rods 22 are secured within composite members 24 (see the cutaway portion of FIG. 1). In FIG. 1, only one end of each of two adjacent fuel bundles is shown, however, both ends of the bundles are identical. The fuel rods 22 in the bundles 20 are arranged in parallel with the longitudinal axis of the container 12.

The fuel rod 22 comprises a cylindrical shaped body of fuel material 26 disposed within a tube-like shell 28 (see FIGS. 2, 3 and 4). The shell 28 is an elongated tube of circular cross-section having open ends 30. The length of the body of fuel material 26 is shorter than the length of the shell 28 and is positioned within the shell to provide a void at both of its open ends 30. The open ends 30 of the fuel rods 22 are sealed by means of an end plug 32. In FIGS. 3 and 4, respectively, there is shown first an end plug in position to be inserted into the fuel rod, and then the end plug in place in the end of the fuel rod. The end plug 32 is shaped to provide concentrically and serially arranged first, second and third cylindrical sections 34A, 34B and 34C of different transverse cross-sections.

The first section 34A has the smallest transverse cross-section and fits into the open end 30 of the fuel rod shell 28. The two remaining sections 34B and 34C extend exteriorly from the end of the fuel rod 22 as is shown in FIGURE 4.

The diameter of the second section 34B is substantially equal to the outside diameter of the rods and this results in an annular bearing shoulder 35 at the junction of the first and second sections 34A and 34B. This shoulder 35 bears against the end of the outer shell 28. The end plug 32 is integrally connected to the fuel rod 22 to provide a pressure and gas-tight seal therefor.

The diameter of the third section 34C is greater than the diameter of the fuel rod 22, and since it is concentrically arranged it extends equally in all directions beyond the sides of the fuel rods. The diameter of the third section is substantially equal to the center-to-center spacing of the fuel rods 22. The fuel rods 22 with the end plugs 32 attached, are arranged so that the flat ends of the end plugs are disposed in a common transverse plane. The end plugs 32 are then joined together by weldments 38 about their lateral edges 36 to form a composite member 24. When the composite member 24 has been assembled, the circular configuration of the end plugs 32 cooperate to form openings 40 through the composite member. The openings 40 communicate with the spaces or flow channels between the fuel rods 22. These openings 40 originally are cusp shaped with concave sides 40A. They are then reamed out to provide walls 40B forming a circular opening. Each of the openings 40 is located between a group of four fuel rods 22 disposed in a square pattern.

In this manner end plugs 32 for the fuel rods 22 can be assembled to provide a composite member 24 similar to a tube sheet which avoids the costly and time consuming job of drilling a plate as a tube sheet to receive the fuel rods and to supply the coolant flow openings. The end plugs 32 can be turned out in large quantities on an automatic screw machine which will maintain the close tolerances required for proper spacing of the fuel rods.

Therefore, in this invention the end plugs perform a dual purpose; first they provide a seal for the ends of the fuel rods and, secondly, they provide cooperating structures which position and space the fuel rods within a fuel bundle. As has been previously discussed the proper alignment and spacing of the fuel rods within a fuel element is of great importance to the efficiency of the heat transfer system. These end plugs since they can be made to very close tolerances provide the proper spacing of the fuel rods without the attendant high costs previously encountered in tube sheet arrangements.

The end plugs are illustrated and described as having a circular cross-section; however, it is possible to use other cross-sectional shapes to construct the composite members and provide coolant flow openings therefor. An example of another shape that can be used is an end plug of hexagonal shape.

In the drawings the fuel rods are shown in a square lattice. This invention, however, may be used in any symmetrical arrangement of fuel rods within a bundle.

Further, this method of assembling a tube bundle may be used in conjunction with other forms of tube rod spacers to provide any length of fuel rod bundle.

The end plugs are shown as being joined together by weldments. While this is the preferred method of joining the end plugs it is also possible to join them by brazing, pin connections or other connecting means.

While in accordance with the provisions of the statutes the invention has been illustrated and described in the best form and mode of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. The method of manufacturing a nuclear fuel element assembly containing a plurality of fuel rods comprising forming capping means for said fuel rods such that the greatest transverse dimension of the capping means substantially equals the centerline spacing between said fuel rods, placing said capping means on the ends of said fuel rods, arranging said fuel rods in parallel relationship, joining said capping means together with the lateral edges thereof in contact to form a composite tube sheet member having openings in said composite member to permit the flow of a fluid therethrough.

2. The method of manufacturing a nuclear fuel element assembly containing a plurality of fuel rods comprising forming capping means for said fuel rods such that the greatest transverse dimension of the capping means substantially equals the centerline spacing between said fuel rods, integrally attaching said capping means to the ends of said fuel rods, arranging said fuel rods in parallel relationship, integrally joining said capping means together about the lateral edges thereof to form a composite member and forming openings through said composite tube sheet member to permit the flow of a fluid therethrough.

3. The method of manufacturing a nuclear fuel element assembly containing a plurality of fuel rods comprising forming capping means for said fuel rods such that the greatest transverse dimension of the capping means substantially equals the centerline spacing between said fuel rods, placing said capping means on the ends of said fuel rods, integrally attaching said capping means to the fuel rods, uniformly spacing said fuel rods in parallel relationship, integrally attaching said capping means together about the lateral edges thereof to form a composite tube sheet member and forming openings through said composite member to permit the flow of a fluid therethrough.

References Cited in the file of this patent

UNITED STATES PATENTS 2,780,596    Anderson _____ Feb. 5, 1957
2,825,689    Szilard et al. _____ Mar. 4, 1958

OTHER REFERENCES

Nucleonics, vol. 15, No. 1, January 1957, pp. 85–91.
TID–7529 (Pt. 1), Reactor Heat Transfer Conf. of November 1–2, 1956, pp. 248–254.
TID–7546 (Book 2), Fuel Element Conf., November 18–23, 1957, pp. 710–714,